(12) United States Patent
Karstens (10) Patent No.: US 7,668,854 B2
(45) Date of Patent: Feb. 23, 2010

(54) SYSTEM AND METHOD OF BUILDING PROVEN SEARCH PATHS

(75) Inventor: Christopher Kent Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 10/844,145

(22) Filed: May 12, 2004

(65) Prior Publication Data

US 2005/0256847 A1    Nov. 17, 2005

(51) Int. Cl.
*G06F 17/30* (2006.01)
(52) U.S. Cl. .................. 707/102; 707/1; 707/3; 707/100; 707/10
(58) Field of Classification Search ............ 707/3–10, 707/1–2, 100, 102
See application file for complete search history.

(56) References Cited

U.S. PATENT DOCUMENTS

| | | | | |
|---|---|---|---|---|
| 5,893,091 A | * | 4/1999 | Hunt et al. ............ | 707/3 |
| 6,026,388 A | * | 2/2000 | Liddy et al. ............ | 707/1 |
| 6,338,059 B1 | * | 1/2002 | Fields et al. ............ | 707/4 |
| 6,408,316 B1 | * | 6/2002 | Himmel et al. ............ | 715/206 |
| 6,421,675 B1 | * | 7/2002 | Ryan et al. ............ | 707/100 |
| 7,167,901 B1 | * | 1/2007 | Beadle et al. ............ | 709/207 |
| 2004/0215608 A1 | * | 10/2004 | Gourlay ............ | 707/3 |
| 2005/0114756 A1 | * | 5/2005 | Lehikoinen et al. ............ | 715/501.1 |

* cited by examiner

*Primary Examiner*—Cam-Linh Nguyen
(74) *Attorney, Agent, or Firm*—Coats & Bennett, PLLC (57) ABSTRACT

A system and method associates a search term with a document accessible over a network. In one embodiment, the search term and an address to the document is received from a user. The system creates the association responsive to user input indicating that the association should be made, and presents the association to users responsive to a subsequent query that includes the search term. The address may be, for example, a URL or an IP address of a web page accessible over the Internet.

43 Claims, 7 Drawing Sheets

| | | 60 |
|---|---|---|
| 62 | 64 | 66 |
| term 1 | www.site1.com | 87 |
| term 2 | www.site2.com | 41 |
| term 3 | www.site3.com | 92 |
| term3 | 197.215.119 | 4 |
| ⋯ | ⋯ | ⋯ |
| term4 | www.site4.com | 15 |

SYSTEM AND METHOD OF BUILDING PROVEN SEARCH PATHS

BACKGROUND

The present invention relates generally to computer searching systems, and particularly to search engines that perform searches based on keywords.

The Internet has grown from meager beginnings to a network that interconnects users all over the world. Users now enjoy access to virtually any type of information imaginable in the form of hundreds of millions of web pages. However, for all its good, the sheer number of web pages often makes finding a single web page of interest a daunting task.

Search Engines help people sift through and find information on the Internet by indexing web pages and documents, and storing information regarding the sites they find in a searchable database. This information includes, for example, the Universal Resource Locator (URL) or certain keywords contained in the web pages. Users may then search this database for a desired web page by entering terms and/or phrases through a browser window. However, conventional search engines typically present tens of thousands or even hundreds of thousands of hits to the user, who must then sift through the results. More perceptive users can narrow their searches using Boolean operators, but still face the prospect of sifting through perhaps hundreds or thousands of hits. Further adding to this problem is that most, if not all search engines, index only those terms or phrases found on or provided by the web pages themselves. Therefore, most users find a desired web page often only after a going through a time-consuming trial and error process. It would be beneficial if users could benefit from the results of previous searches.

SUMMARY

The present invention provides a system and method that allows a user conducting a search over a network to benefit from the results of previous searches conducted by the user, as well as by other users. In one embodiment, a search portal comprises a server operating on a network and a search engine communicatively connected to the server. The search engine receives a search term, and an address to a document to be associated with the search term, from the user. The document is accessible to the user over the network. The search engine creates an association between the search term and the address, and stores the association. Later, the search engine may present the association to one or more subsequent users responsive to a subsequent query that includes the search term.

In an alternate embodiment, a user terminal comprises a display, memory, and a controller communicatively connected to both the memory and the display. The controller executes a software program stored in memory. The software program includes instructions that configure the controller to accept a search term from a user, and display a document associated with an address to the user. The document, for example, a web page, is accessible to the user over the network. The instructions further configure the controller to accept an indication from the user to create an association between the search term and the address. The association may be created and stored on the users terminal, or alternatively, may be forwarded for creation and/or storage on a server in the network.

DETAILED DESCRIPTION

Figure 1:
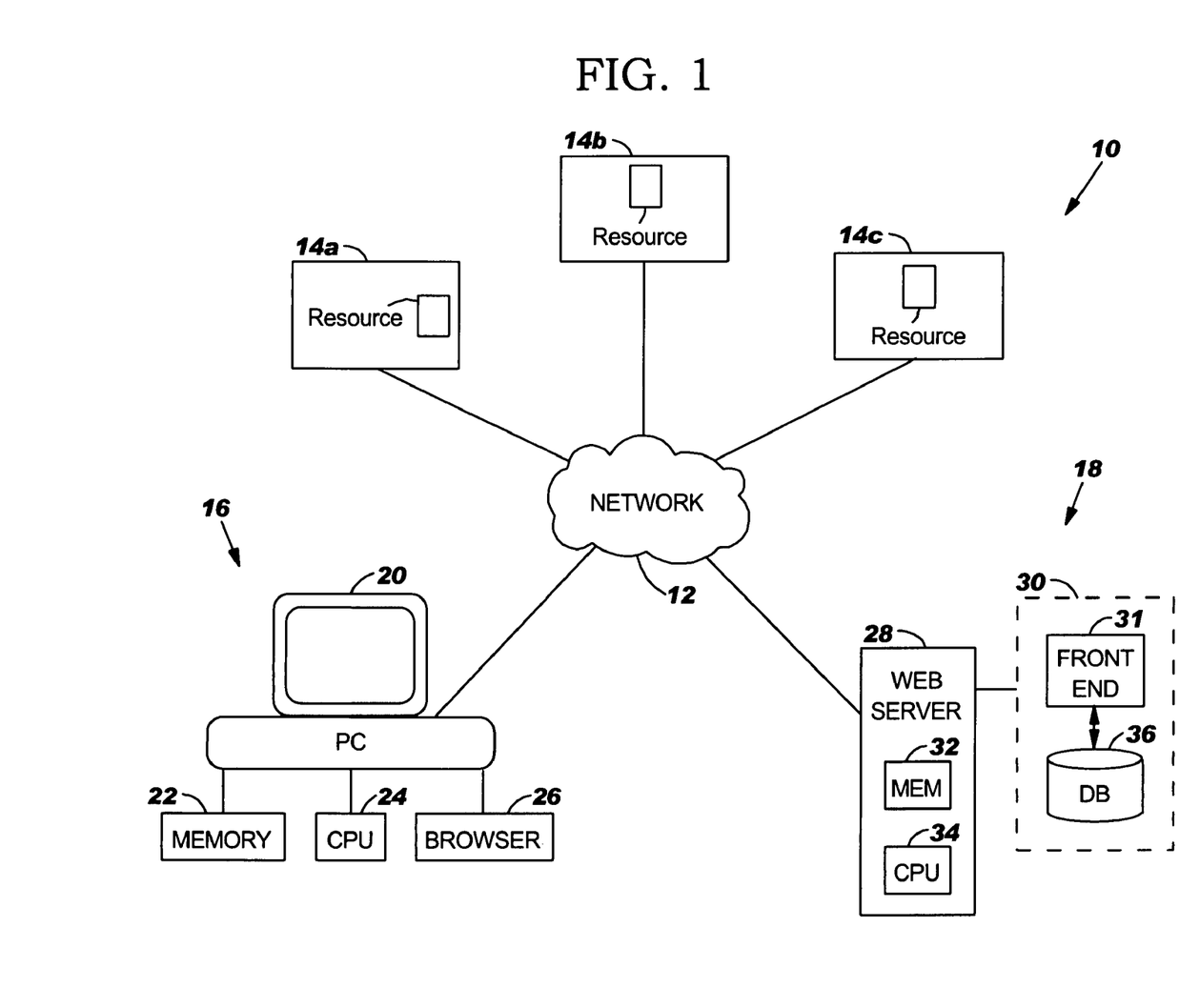
FIG. 1 illustrates a block diagram of a network according to one embodiment of the present invention.

Referring now to FIG. 1, a system that operates according to one embodiment of the present invention is shown therein and indicated generally by the number 10. System 10 comprises a network 12, one or more resource servers 14a, 14b, 14c, a user terminal 16, and a search portal 18.

Network 12 comprises a packet data network such as the Internet or a company Intranet, and interconnects the one or more resource servers 14a, 14b, 14c, containing resources, user terminal 16, and search portal 18. Data messages, such as email, web pages, documents, and other information, are communicated over network 12 as packets of data between terminal 16 and search portal 18. Data is typically sent across network 12 using an appropriate protocol such as TCP/IP, for example. Resource servers 14a, 14b, and 14c comprise information that is accessible to terminal 16 and search portal 18 via network 12. This includes web pages, documents, data, and images stored in memory on resource servers 14 connected to network 12. Typically, terminal 16 includes software that requests these resources from resource servers 14a, 14b, and/or 14c, and displays them to the user.

Terminal 16 may run any operating system known in the art including, but not limited to, WINDOWS and UNIX. Terminal 16 includes a display 20, memory 22, microprocessor 24, and a browser 26. Display 20 displays information to the user received from search portal 18. Memory 22 encompasses the entire hierarchy of memory available to terminal 16, including RAM, ROM, disk storage, and read/write CD. Memory 22 stores data, program instructions, and other information used by terminal 16, and may be partitioned into a temporary partition and a long-term partition. The temporary partition includes memory such as cache and RAM where data temporarily resides. The long-term partition includes memory such as the hard drive(s) and/or CD, and stores data for long periods. In one embodiment, the long-term partition of memory 22 includes a searchable database. As will be described below, data may move between the temporary and long-term partitions of memory 22.

Microprocessor 24 embodies any microprocessor or microprocessors known in the art, and controls the operation of terminal 16 according to program instructions stored in memory 22. Microprocessor 24 reads/writes data from/to memory 22, and executes program instructions for software stored on terminal 16, such as the operating system and browser 26. Microprocessor 24 communicates with search portal 18 via network 12, and displays information received from search portal 18 to the user on display 20.

Browser 26 is a software package stored in memory 22 and run by microprocessor 24. Some examples of browser 26 include INTERNET EXPLORER and NETSCAPE. As will be described in more detail below, browser 26 is configured to communicate with search portal 18 according to the present invention.

Search portal 18 comprises a server 28 communicatively connected to a search engine 30. Search portal 18 is typically a collection of hardware and software that presents a front end to search engine 30. Some examples of search portals 18 are YAHOO, ALTA VISTA, and GOOGLE. Of course, this list is in no way exhaustive, as many other search portals exist.

Server 28 comprises memory 32 and microprocessor 34. Memory 32 and microprocessor 34 are similar to their counterparts in terminal 16, and thus, their specifics need not be repeated here. It is sufficient to say that memory 32 may also be partitioned into temporary and long-term storage, and that microprocessor 34 is configurable to operate according to the present invention.

Server 28 may be a web server, for example, that communicates with terminal 16. A web server transports web pages, documents, images, and other information from sites across network 12 to terminal 16. As stated above, this includes resource on resource servers 14. Server 28 may also launch applications that handle certain types of requests, for example, when the user of terminal 16 wants to purchase items from other sites connected to network 12. In these cases, server 28 may launch software programs that assist the user in finding specific items listed on the site, as well as encrypt information to provide security for the user of terminal 16.

Search engine 30 includes a front-end 31 connected to a database 36 containing web sites, documents, and other information collected by a computer program running on server 28. These programs, called wanderers, crawlers, robots, worms, or spiders, typically scour network 12 for new and modified resources on resource servers 14, and store their IP addresses and keywords contained in the resources in search database 36. To facilitate fast searching, the IP addresses and/or keyword terms are typically indexed in database 36. When search engine 30 receives a keyword and/or search term entered into browser 26, front-end 31 searches database 36 to locate relevant records. Once located, search engine 30 returns the results of the search to terminal 16 for display to the user.

Importantly, conventional search engines select relevant records based only on those keywords entered by the user into browser 26. This is because conventional search engines do not evaluate resources on resource servers 14 prior to storing their addresses. Rather, conventional search engines store and associate the IP address of a document with only those terms and/or keywords actually found within the HTML content of the resources.

For example, web page authors typically include meta tags in their HTML code. Meta tags are lists of keywords that web page authors use to augment their documents with information (e.g., describe what their web page is about), and define how search engines index their web page. Conventional search engines read this information, and index the web pages according to these keywords. Although browsers do not normally display this information, it is part of the web page's HTML content nevertheless. For those web pages that do not contain meta tags, the search engines will typically index on at least a portion of the web page's HTML contents.

Therefore, conventional search engines index web pages based only on the actual HTML content of the web page. Thus, users must necessarily enter one of those keywords for the search engine to find and produce a URL to the web page. However, if a user does not enter a keyword contained in either in the meta tags or in the HTML content of the web page itself, it is likely that that the search engine will not present that web page as a result. The present invention, however, is configured to associate resources on resource servers 14 with terms and/or keywords that may not found within the actual content of the resources.

To do this, the present invention creates and stores an association between the search term(s) entered by the user and the address of a desired resource, for example, its URL or IP address. Because the present invention associates the user-entered term(s) with the address, there is no requirement that the search term(s) be included in the web pages' HTML content; Associating the term(s) and the address is done responsive to user input indicating that the association should be made. In a preferred embodiment, the present invention generates statistics based on the number of users that have associated the search term(s) with the address in previous searches. This information may be shared with other users conducting searches using the same search term(s).

Figure 2:
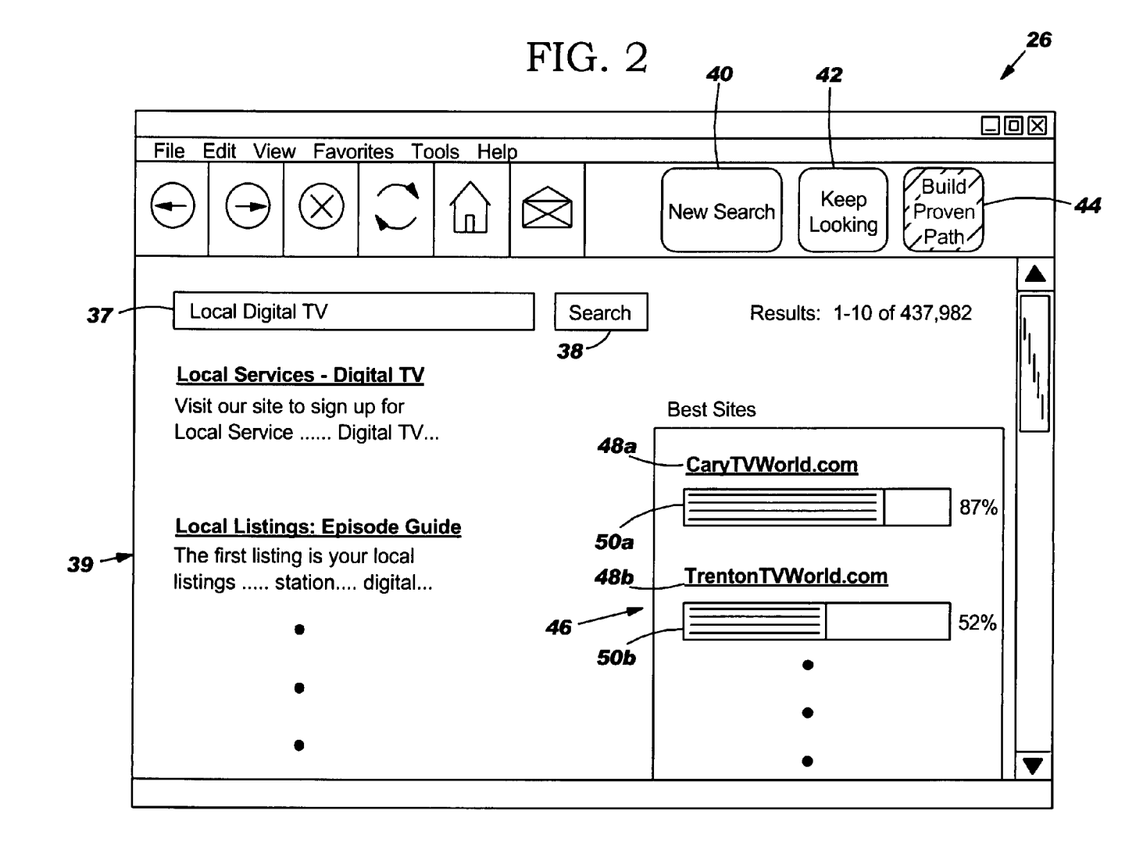
FIG. 2 illustrates a browser configured to operate according to one embodiment of the present invention.
Figure 3:
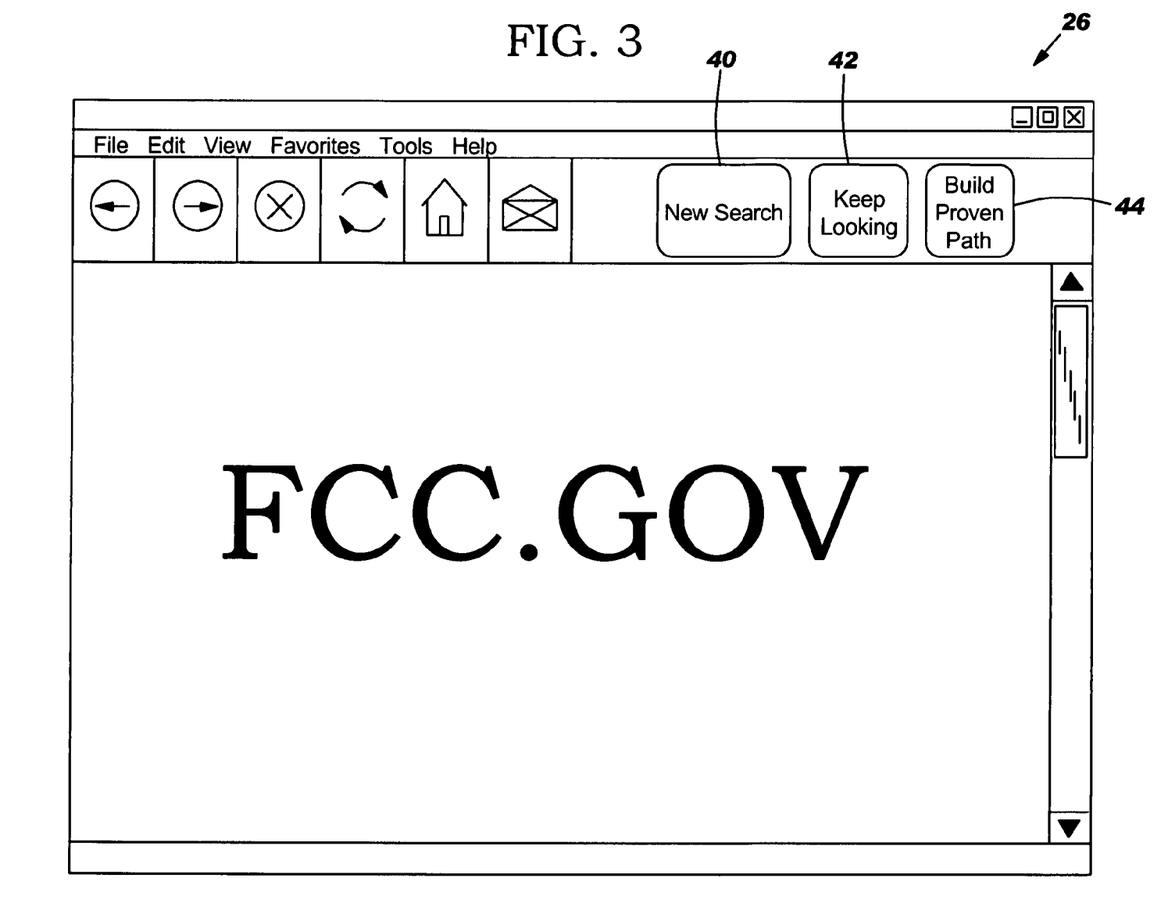
FIG. 3 illustrates a web page located using one embodiment of the present invention.

FIGS. 2 and 3 illustrate one embodiment of a browser 26 that is configured to facilitate the evaluation process performed by search engine 30. The details of the conventional operation of browser 26 are well known, and thus, not described here. However, browser 26 is also configured to permit a user to indicate the success or failure of a given search, and to display the results of previous searches. As will be described later in more detail, it is not required that the search terms entered by the user appear within the content of the resource.

As seen in FIGS. 2 and 3, browser 26 comprises a user interface having an entry field 37, a search button 38, and a group of control buttons 40, 42, and 44 to permit the user to interact with search engine 30. Control buttons 40, 42, and 44 may be integrated with the browser 26 or, alternatively, integrated with the web page. Browser 26 also comprises a "Best Sites" list 46 that displays one or more hypertext links 48a, 48b to documents located by users that have conducted previous searches using the same or similar terms. As will be described later in more detail, links 48 are links to those resources whose addresses have been associated with the same search term(s) entered in previously conducted queries. Each link 48a, 48b also has an evaluation indicator 50a, 50b, respectively, that indicates the number of users that have associated the search term(s) with its address during previous searches.

By way of example, a user enters one or more search terms into entry field 37, clicks on search button 38, and receives a conventional result list 39, and a best site list 46 for display from search engine 30. Each item in result list 39 and best site list 46 is a hypertext link. In the embodiment of FIG. 2, the user entered the terms "Local Digital TV," and received over 437,000 hits. The user may go to one of the web pages listed in list 39, or best site list 46, simply by clicking on the list item to activate its hypertext link. Alternatively, the user may enter another search term, or click on either the "Keep Looking" control 42 or the "New Search" control 40. Note, however, that the "Build Proven Path" control 44 is not enabled in FIG. 2.

Clicking on the "Keep Looking" control 42 stores the search terms entered by the user into temporary memory, and permits the user to enter additional terms. In one embodiment, the terms entered by the user are stored in cache on terminal 16. In another embodiment, the terms are stored as cookies on terminal 16. Still other embodiments encompass storing the search terms in the temporary partition of memory 32 on server 28. Clicking on the "New Search" control 40 clears any terms stored in the temporary partition of memory 22, 32, and permits the user to start over.

Of course, it should be noted that the user is not required to click on the "Keep Looking" control 42 in order to continue building a proven path. Alternatively, the user may simply enter additional search terms without clicking the "Keep Looking" control 42. In either case, the search terms would still be stored in temporary memory as described above.

Once the user has found a desired web page, either by activating the hypertext link in list 39, list 46, or simply by following other links, the user clicks the "Build Proven Path" control 44, which is now enabled. Clicking the "Build Proven Path" control 44 indicates that an association should be made between the search term(s) stored in temporary memory and the address of the web page currently displayed. As seen in FIG. 3, the user has located the "FCC.GOV" site, and thus, the term "Local Digital TV" will be associated with the address of the FCC.GOV web page. Note that none of the terms "Local," "Digital," or "TV" need to be contained in the HTML content of the FCC.GOV page or site itself.

There are various ways in which to associate the search term(s) and the address of the web page. In one embodiment, browser 26 sends both the search term(s) stored in the temporary partition of memory 22 and the address of the web page to search engine 30. Search engine 30 then maps the received terms to the received address, and stores the mapping in database 36. In another embodiment, browser 26 performs the mapping and sends the mapping to search engine 30 for storage. In any case, whenever a user conducts a subsequent query using the term "Local Digital TV," search engine 30 may present the associated FCC.GOV web page address as a hypertext link to the user.

Once the terms are associated with the address, an evaluation of the number of users that have previously associated the same term(s) with the same address is made. As above, search engine 30 may perform the evaluation. The evaluation of the association may then be displayed to the user along with its hypertext link in subsequent queries. As seen in FIG. 2, indicator 50a shows that 87% of the users entering the term "Local Digital TV" actually wanted the "CaryWorldTV.com" web page identified by hypertext link 48a, while 52% of the users actually wanted the "TrentonWorldTV.com" web page identified by hypertext link 48b. Thus, the user benefits from the results of other users' searches that included the same search term.

It should be noted, however, that the present invention does not require that search terms be entered exactly as they are mapped in order to benefit from the results of previously-built proven paths. That is, a user conducting a subsequent query need not enter the term "Local Digital TV" in its entirety to see the hypertext links 48a and 48b. Rather, these links 48 would be displayed to the user when the user enters any of the terms. For example, hypertext links 48a and 48b may be displayed if the user enters the term "Local" or the term "Digital."

Figure 4:
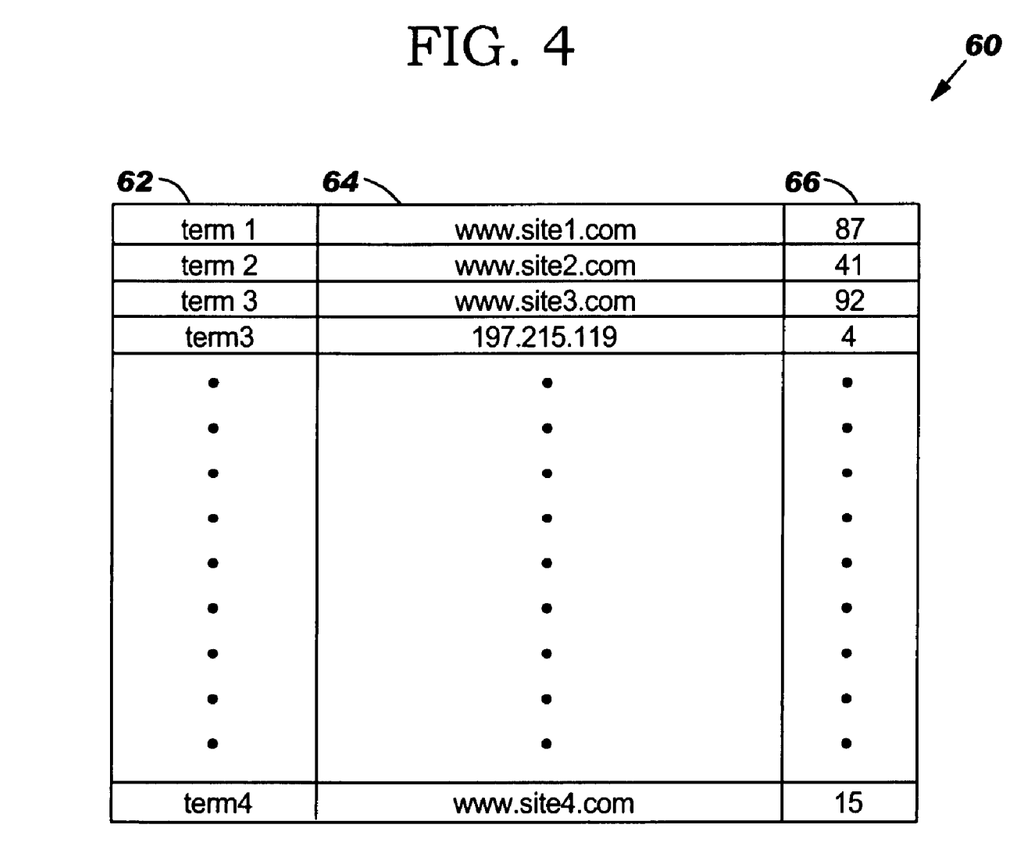
FIG. 4 illustrates how paths are associated according to one embodiment of the present invention.

FIG. 4 illustrates the association between the search term and the address according to one embodiment of the present invention. Table 60 comprises three columns 62, 64, and 66. Column 62 includes an entry for each of the one or more terms 62 used in searches, while column 64 includes an entry that identifies the address of the resource mapped to the terms of column 62. Column 66 includes the evaluation associated with the terms in column 62 and the addresses of column 64.

Figure 5:
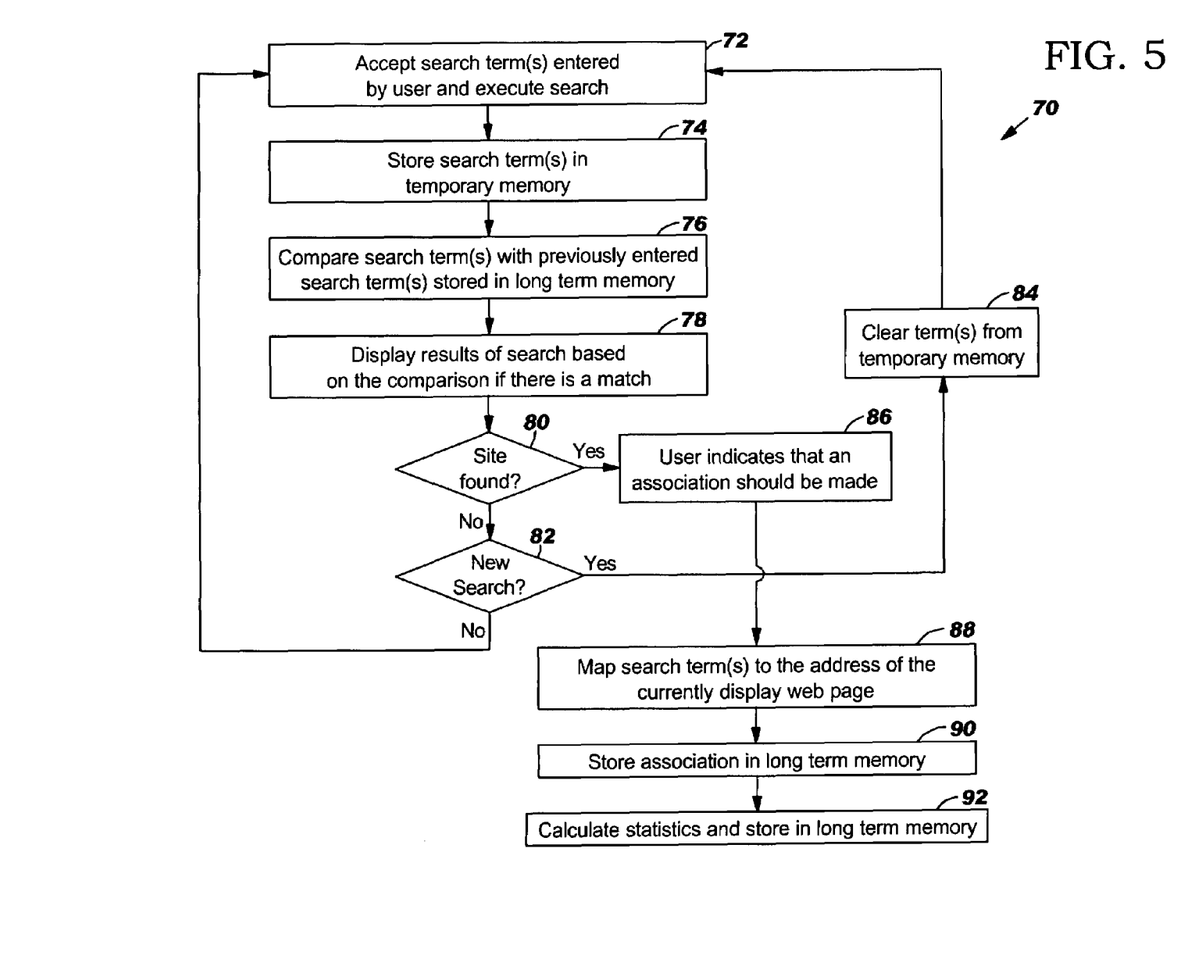
FIG. 5 illustrates a method according to one embodiment of the present invention.

FIG. 5 shows one method according to the present invention. Method 70 begins when browser 26 and/or search engine 30 accepts one or more search terms entered by the user, and executes the search (box 72). The terms entered by the user are stored in the temporary partition of memory 22 or memory 32 (box 74), and compared with those terms and paths stored in the long-term partition of memory 22 or memory 32 (box 76). If the comparison yields a match, browser 26 displays the results to the user along with the results of a conventional search (box 78).

Once the user is presented with the search results, the user clicks on a hypertext link in list 39 or list 46 to display a web page. If the user has not found the site (box 80), the user may then begin a new search (box 82), or add additional search terms. If the user chooses to begin a new search (box 82), the temporary partition in memory 22 and/or 32 is cleared of all search terms stored for the current search (box 84) and the user simply begins anew (box 72). If the user chooses to continue the current search (box 82), the user enters additional search terms (box 72). The additional search terms are then added to temporary memory 22 and/or 32.

When the user finds the desired site (box 80), the user indicates that the terms and the address of the desired web page should be associated with each other (box 86). Browser 26 or search engine 30 then maps the terms to the address of the web page (box 88) and stores the association in memory 22 and/or 32 (box 90). In the embodiments where browser 26 performs the mapping, it sends the mapping to search engine 30 for storage. Alternatively, search engine 30 may receive the terms and the address from browser 26, and perform the mapping itself. Finally, search engine 30 calculates the evaluation score, and stores the calculation with the path in long-term memory.

Those skilled in the art will appreciate that the controls 40, 42, and 44 on FIGS. 2 and 3 may be substituted with other controls as desired without departing from the present invention. One embodiment of the present invention contemplates the use of a radio button group that augments or replaces controls 40, 42, 44. For example, the radio button group may comprise two radio buttons. A first button would indicate success (e.g., "I found It!"), while a second radio button would indicate failure (e.g., "Not yet!"). Still a third radio button may permit the user to begin a new search ("e.g., "Start again!"). In each case, however, the functionality would permit the user to indicate that an association should or should not be made between the terms entered by the user and the address of the currently displayed web page.

Figure 6:
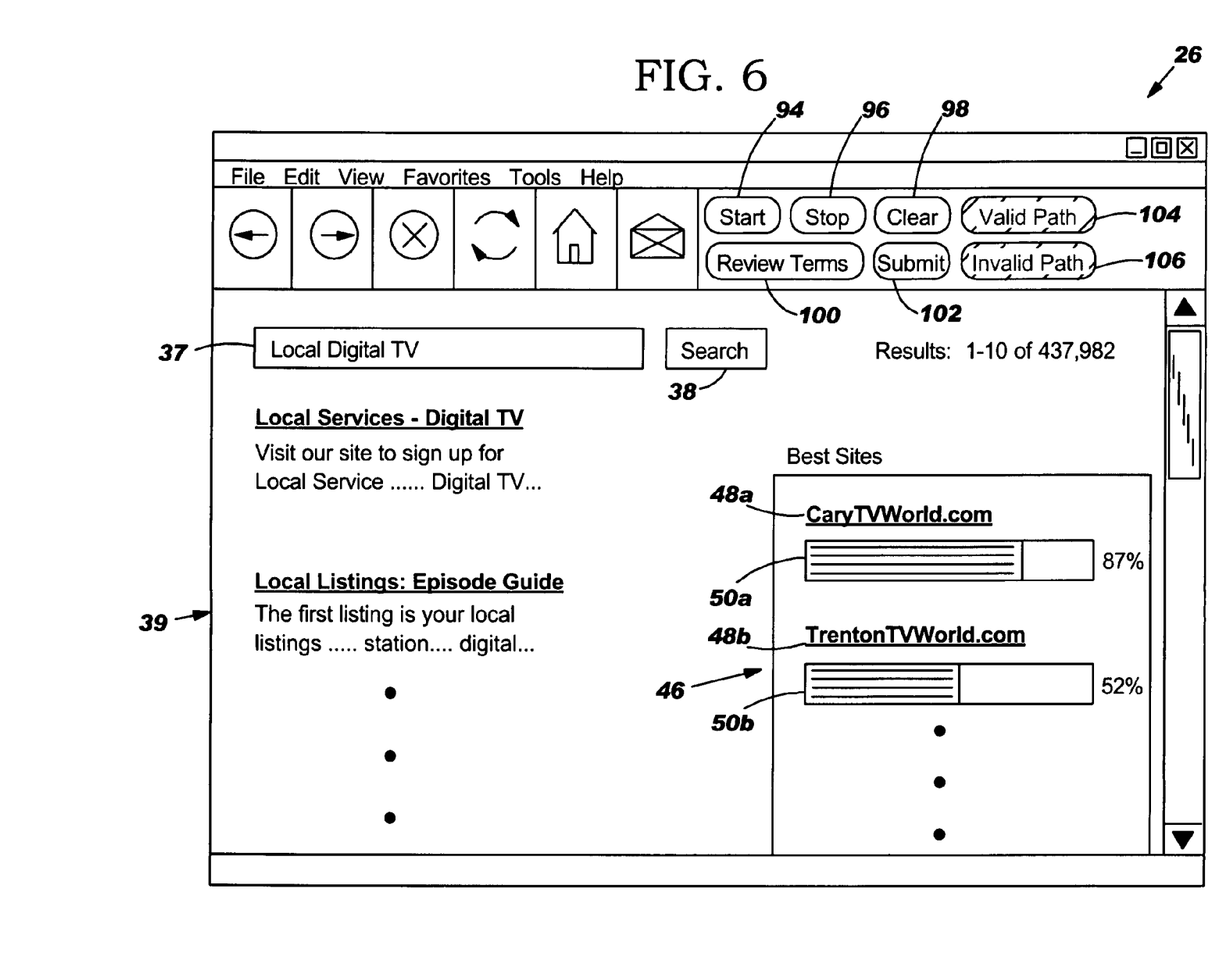
FIG. 6 illustrates a browser configured to operate according to an alternate embodiment of the present invention.
Figure 7:
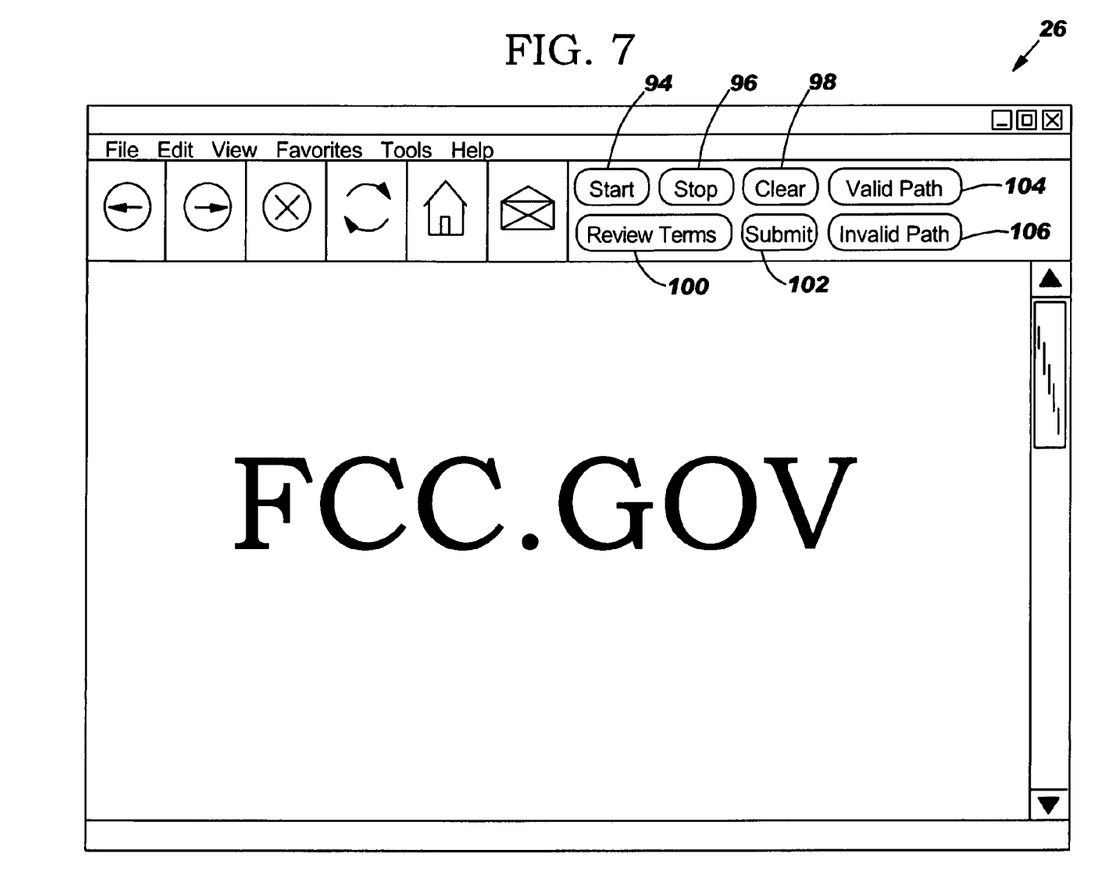
FIG. 7 illustrates a web page located using the alternate embodiment of FIG. 6.

FIGS. 6 and 7 illustrate another embodiment of the present invention that uses different controls and a voting scheme. Browser 36 includes a "Start" control 94, a "Stop" control 96, a "Clear" control 98, a "Review Terms" control 100, and a "Submit" control 102. Browser 26 also includes two controls 104 and 106 labeled "Valid Path" and "Invalid Path," respectively.

The "Start" and "Stop" controls 94 and 96 permit a user to enable and disable the proven path functionality. The "Clear" control 98 is similar to the "New Search" control 40 in that it clears all search terms stored in temporary memory. The "Review Terms" control 100 allows users to review their entered search terms before submitting them for use in building a proven path. For example, clicking on the "Review Terms" control 100 may invoke a dialog window (not shown) or other similar interface that allows the user to view all of the search terms entered thus far. As stated above, the search terms are stored in temporary memory. The "Submit" control 102 submits the terms stored in temporary memory for use in building a proven path. "Submit" control 102 is similar in functionality to the "Build Proven Path" control 44 of FIGS. 2 and 3. In addition, however, "Submit" control 102 may be configured to automatically invoke the same interface invoked when the user clicks the "Review Terms" control 100 to allow the user to review the terms prior to submission. "Submit" control 102 may also generate a confirmation page with the search terms and the associated link.

Once the user finds the desired website or document, the user may vote on the success or failure of the proven path using the "Valid Path" and "Invalid Path" controls 104 and 106. These controls would provide information to the search engine used in updating the evaluation score as noted above.

As seen in the figures, the results of past associations are shown as being displayed in a separate "Best Sites" list 46. Alternatively, however, the results of past associations may be displayed along with those uncovered using the conventional search in list 39. In one embodiment, hypertext links indicating previous associations are intermingled with the links located using the conventional search to generate a single results list. Then, the single results list is sorted such that the links identifying the previous associations appear before the links found using the conventional search.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of creating an association between current or prior search terms and a document accessible over a network comprising:
    receiving a first search string comprising one or more search terms entered by a user conducting a search for an electronic document;
    storing the first search string in memory;
    executing a first query that includes the first search string;
    displaying a result of the first query to the user;
    receiving a second search string entered by the user;
    storing the second search string in memory;
    executing a second query that includes the second search string;
    displaying a result of the second query to the user;
    receiving an address to a document selected from the results of the second query by the user, said address to be associated with at least said first search string;
    receiving user input indicating that an association between at least said first search string and said address should be made;
    creating the association between at least said first search string and said address based on the user input;
    storing the association in memory; and
    presenting the association responsive to receiving a term in the first search string for a subsequent query.

2. The method of claim 1 further comprising storing said first search string in temporary memory.

3. The method of claim 2 further comprising receiving an indication from said user to begin a new search.

4. The method of claim 3 further comprising deleting said first search string from said temporary memory.

5. The method of claim 1 wherein storing the association in memory comprises mapping said first search string to said address.

6. The method of claim 5 further comprising storing said mapping in a database.

7. The method of claim 1 further comprising generating statistics representative of the number of users that have associated said first search string with said address.

8. The method of claim 7 further comprising sending said address as a link to a subsequent user responsive to said subsequent query.

9. The method of claim 8 further comprising sending an indicator of said statistics to said subsequent user responsive to said subsequent query.

10. The method of claim 1 wherein said address comprises a URL of a web page.

11. The method of claim 1 wherein said address comprises an IP address of a web page.

12. The method of claim 1 wherein a server in the network performs the steps.

13. The method of claim 1 wherein a software component on the user's terminal performs the steps.

14. The method of claim 13 wherein said software component comprises a browser.

15. A search portal comprising:
    a server operating on a network; and
    a search engine communicatively connected to said server and configured to:
        receive a first search string comprising one or more search terms entered by a user conducting a search for an electronic document;
        store the first search string in memory;
        execute a first query that includes the first search string;
        display a result of the first query to the user;
        receive a second search string entered by the user;
        store the second search string in memory;
        execute a second query that includes the second search string;
        display a result of the second query to the user;
        receive an address to a document selected from the results of the second query by the user to be associated with at least said first search string;
        receive input from the user indicating that said association should be made;
        create the association between at least said first search string and said address received from the user based on the user input;
        store the association in a memory; and
        present the association responsive to receiving a term in the first search string for a subsequent query.

16. The search portal of claim 15 further comprising temporary memory communicatively connected to said search engine to store said first search string.

17. The search portal of claim 15 wherein said search engine is further configured to map at least a term in said first search string to said address.

18. The search portal of claim 17 wherein said search engine is further configured to store said mapping in a database communicatively connected to said search engine.

19. The search portal of claim 15 wherein said search engine is further configured to generate statistics representative of the number of users that have associated a term in said first search string with said address.

20. The search portal of claim 19 wherein said search engine is further configured to send said address as a link to a subsequent user responsive to said subsequent query.

21. The method of claim 20 wherein said search engine is further configured to send an indicator of said statistics to said subsequent user responsive to said subsequent query.

22. A method of creating an association between search terms and a document accessible over a network comprising:

accepting a first search string comprising one or more search terms entered by a user conducting a search for an electronic document;
storing the first search string in memory:
executing a first query that includes the first search string;
displaying a result of the first query;
accepting a second search string entered by the user;
storing the second search string in memory;
executing a second query that includes the second search string;
displaying a result of the second query to the user, the result including a document associated with an address accessible over the network to the user;
accepting an indication from the user to create an association between said first search string and said address;
creating the association between said first search string and the address based on the user indication; and
storing the association in a memory.

23. The method of claim 22 further comprising storing first search string in temporary memory.

24. The method of claim 23 further comprising accepting an indication from said user to begin a new search.

25. The method of claim 24 further comprising deleting said first search string from said temporary memory.

26. The method of claim 22 further comprising forwarding said first search string and said address to a server in the network.

27. The method of claim 22 wherein storing the association in a memory comprises mapping said first search string to said address.

28. The method of claim 27 further comprising forwarding said mapping to a server in the network.

29. The method of claim 22 further comprising receiving said address as a link responsive to a subsequent query that includes said first search string.

30. The method of claim 29 further comprising receiving statistics representative of the number of users that have already associated said first search string with said address.

31. The method of claim 22 wherein said address comprises a URL of a web page.

32. The method of claim 22 wherein said address comprises an IP address of a web page.

33. The method of claim 22 further comprising sharing said association with one or more other users.

34. A computing device comprising:
a display;
memory;
a controller communicatively connected to said memory and said display; and
a software program operative to configure said controller to:
accept a first search string comprising one or more search terms entered by a user conducting a search for an electronic document;
store the first search string in memory;
execute a first query that includes the first search string;
display a result of the first query;
receive a second search string entered by the user;
store the second search string in memory;
execute a second query that includes the second search string;
display a result of the second query, the result including a document associated with an address accessible over the network to the user;
accept an indication from the user to create an association between said first search string and said address;
create the association between the first search string and the address based on the user indication; and
store the association in memory.

35. The computing device of claim 34 wherein said memory comprises temporary memory to store said search term.

36. The computing device of claim 35 wherein said software program is further operative to configure said controller to accept an indication from said user to begin a new search.

37. The computing device of claim 36 wherein said software program is further operative to configure said controller to delete said first search string from said temporary memory.

38. The computing device of claim 34 wherein said software program is further operative to configure said controller to forward said first search string and said address to a server in the network.

39. The computing device of claim 34 wherein said software program is further operative to configure said controller to map said first search string to said address.

40. The computing device of claim 39 wherein said software program is further operative to configure said controller to forward said map to a server in the network.

41. The computing device of claim 34 wherein said software program is further operative to configure said controller to receive said address as a link responsive to a subsequent query that includes said first search string.

42. The computing device of claim 41 wherein said software program is further operative to configure said controller to receive statistics representative of the number of users that have already associated said first search string with said address.

43. The computing device of claim 34 wherein said software program is further operative to configure said controller to share said association with one or more other users.

* * * * *

UNITED STATES PATENT AND TRADEMARK OFFICE
CERTIFICATE OF CORRECTION

| | | |
|---|---|---|
| PATENT NO. | : 7,668,854 B2 | Page 1 of 1 |
| APPLICATION NO. | : 10/844145 | |
| DATED | : February 23, 2010 | |
| INVENTOR(S) | : Christopher Kent Karstens | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Seventh Day of December, 2010

David J. Kappos
*Director of the United States Patent and Trademark Office*